(12) United States Patent
Nakayasu et al.

(10) Patent No.: US 8,459,187 B2
(45) Date of Patent: Jun. 11, 2013

(54) GAS GENERATOR

(75) Inventors: Masayuki Nakayasu, Hyogo (JP); Gen Kinoshita, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 202 days.

(21) Appl. No.: 12/562,662

(22) Filed: Sep. 18, 2009

(65) Prior Publication Data

US 2010/0071580 A1    Mar. 25, 2010

Related U.S. Application Data

(60) Provisional application No. 61/100,129, filed on Sep. 25, 2008.

(30) Foreign Application Priority Data

Sep. 19, 2008  (JP) .................................. 2008-240218

(51) Int. Cl.
    *C06D 5/00*    (2006.01)
(52) U.S. Cl.
    USPC ............................. 102/530; 102/367; 280/741
(58) Field of Classification Search
    USPC ................... 102/367, 530, 531, 282; 280/741, 280/736
    See application file for complete search history.

(56) References Cited

U.S. PATENT DOCUMENTS

| | | | |
|---|---|---|---|
| 4,068,862 A * | 1/1978 | Ishi et al. ....................... | 280/740 |
| 4,178,017 A * | 12/1979 | Ishi et al. ....................... | 280/740 |
| 5,454,586 A * | 10/1995 | Rogerson .................... | 280/728.2 |
| 5,487,559 A * | 1/1996 | Headley ......................... | 280/735 |
| 5,601,308 A * | 2/1997 | Cuevas ......................... | 280/736 |
| 5,890,735 A * | 4/1999 | Smith ........................... | 280/737 |
| 6,447,008 B1 * | 9/2002 | Karlin et al. ................... | 280/741 |
| 6,557,890 B1 * | 5/2003 | Karlin et al. ................... | 280/741 |
| 7,007,610 B2 * | 3/2006 | Karlin et al. ................... | 102/531 |
| 7,044,502 B2 * | 5/2006 | Trevillyan et al. ............. | 280/741 |
| 7,150,227 B2 | 12/2006 | Matsuda | |
| 7,374,204 B2 | 5/2008 | Hoffman et al. | |
| 7,401,808 B2 * | 7/2008 | Rossbach et al. ............. | 280/737 |
| 7,726,687 B2 * | 6/2010 | Hoffman et al. .............. | 280/740 |
| 7,878,535 B2 * | 2/2011 | Rose et al. ..................... | 280/736 |
| 2004/0046373 A1 * | 3/2004 | Wang et al. .................... | 280/741 |

(Continued)

FOREIGN PATENT DOCUMENTS

DE  10 2004 027 153 A1  12/2004
EP      1 564 087 A1     8/2005

(Continued)

*Primary Examiner* — Benjamin P Lee
(74) *Attorney, Agent, or Firm* — Birch, Stewart, Kolasch & Birch, LLP (57) ABSTRACT

A gas generator includes a housing having a gas discharge port, a combustion chamber cup member disposed, in the housing, such that an opening portion thereof covers a bottom surface of the housing, the combustion chamber cup member having a communication hole at least a portion of its peripheral wall surface thereof, a metallic cover member covering the peripheral wall surface provided with the communication hole, and a combustion chamber being formed inside the combustion chamber cup member and accommodating a gas generating agent and an igniter therein, at the time of activation, the cover member expanding and deforming mainly in the radial direction to form a gap between the peripheral wall surface of the combustion cup member and the metallic cover member, which serves as a gas channel leading to the combustion chamber and the outside of the combustion chamber.

12 Claims, 5 Drawing Sheets

U.S. PATENT DOCUMENTS

| | | | |
|---|---|---|---|
| 2005/0189753 A1* | 9/2005 | Kato et al. | 280/741 |
| 2005/0200107 A1 | 9/2005 | Matsuda et al. | |
| 2005/0206145 A1 | 9/2005 | Kato et al. | |
| 2006/0254454 A1* | 11/2006 | Bierwirth | 102/530 |
| 2007/0057496 A1 | 3/2007 | Matsuda et al. | |
| 2007/0085314 A1 | 4/2007 | Matsuda et al. | |
| 2007/0120349 A1* | 5/2007 | Hoffman et al. | 280/741 |
| 2008/0211215 A1* | 9/2008 | Hoffman et al. | 280/736 |
| 2008/0257195 A1* | 10/2008 | Nakayasu et al. | 102/530 |
| 2010/0186616 A1* | 7/2010 | Reichelt et al. | 102/530 |

FOREIGN PATENT DOCUMENTS

| | | |
|---|---|---|
| EP | 1 568 925 A1 | 8/2005 |
| JP | 6-344851 A | 12/1994 |
| JP | 7-61316 A | 3/1995 |
| JP | 2005-199867 A | 7/2005 |
| JP | 2007-118788 A | 5/2007 |
| JP | 2007-131077 A | 5/2007 |

\* cited by examiner

GAS GENERATOR

This nonprovisional application claims priority under 35 U.S.C §119(a) on Patent Application No. 2008-240218 filed in Japan on 19 Sep. 2008 and 35 U.S.C §119(e) on U.S. Provisional Application No. 61/100129 filed on 25 Sep. 2008, which are incorporated by reference.

BACKGROUND OF INVENTION

1. Field of Invention

The present invention relates to a gas generator used in a restraint system for a vehicle.

2. Description of the Related Art

Known gas generators used in restraint systems for vehicles include two combustion chambers. In such gas generators, two combustion chambers are defined by a tubular member or cup member arranged inside a housing.

Such a tubular member or cup member has a through-hole for discharging gas from the combustion chamber defined inside thereof to the outside. These through-holes are closed with a metallic adhesive tape to prevent a gas generating agent from leaking out before activation, and to increase to some extent the combustion pressure for the gas generating agent at combustion. The operation of affixing the adhesive tape over the through-holes requires positioning and is cumbersome. Furthermore, the adhesive strength of the adhesive tape may also deteriorate over time, which is likewise problematic.

FIG. 7A of U.S. Pat. No. 7,374,204 discloses an airbag inflator in which a first chamber 111 involves a second chamber 112. A gas outlet orifice 124b of the second chamber 112 is provided in a peripheral wall surface of a cup 110b which forms the second chamber 112, and the orifice 124 is closed with a cap 120b before activation. When the second chamber is activated, the cap 120b slides upwards to open the orifice 124b as shown in FIG. 7B. Note that, though it is described as "cup 110b", the cup 110b is a cylinder rather than a cup in the drawings and by the function.

US-A 2007/008 5314 (equivalent to JP-A 2007-131 077) discloses a gas generator for an air bag, having, in FIGS. 2 and 4, a cup member 141, enhancer holes 134 and a cup-shaped thin film 147.

SUMMARY OF THE INVENTION

The present invention provides a gas generator, including:
a housing having a gas discharge port,
a combustion chamber cup member disposed, in the housing, such that an opening portion thereof covers a bottom surface of the housing,
the combustion chamber cup member having a communication hole at least a portion of its peripheral wall surface thereof,
a metallic cover member covering the peripheral wall surface provided with the communication hole, and
a combustion chamber being formed inside the combustion chamber cup member and accommodating a gas generating agent and an igniter therein,
at the time of activation, the cover member expanding and deforming mainly in the radial direction to form a gap between the peripheral wall surface of the combustion cup member and the metallic cover member, which serves as a gas channel leading to the combustion chamber and the outside of the combustion chamber.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In the inflator disclosed in U.S. Pat. No. 7,374,204, when the second chamber 112 is activated, the pressure inside the second chamber 112 increases, the cup 110b rises, and at the same time gas is released out of the orifices 124b. As a result, the gas pressure from the orifices 124b may cause the peripheral surface of the cup 110b to bulge and deform in the radial direction. The deformed peripheral surface may come into contact with a wall surface nearby, thereby hampering the rise of the cup 110b, so that the orifices 124b may fail to be sufficiently exposed to the first chamber 111. As an inflator used for restraint, therefore, the above inflator leaves room for improvement in terms of operational reliability.

The present invention provides a gas generator that has a simplified structure and can be assembled more easily while maintaining a high performance and quality.

When the communication holes are formed at two or more portions in the combustion chamber cup member, it is preferable that the communication holes are formed at equal intervals. In case of a communication hole being formed at single portion, for example, there may be formed a single large communication hole, or there may be formed a plurality of small communication holes. When a plurality of communication holes is formed at single portion, the plurality of small communication holes are preferably formed as one cluster (for instance, a plurality of small communication holes are formed to be clustered within one circle).

The position at which the communication holes are formed in the combustion chamber cup member is not particularly limited, so long as it meets the invention.

The metallic cover member has a size and shape that allows covering all the communication holes, and it may be tubular or cup-shaped. The metallic cover member may be formed of stainless steel, aluminum or the like, having a thickness of about 0.2 to 1 mm. When a cup-like cover member is used, an air vent hole may be formed in the bottom surface in order to facilitate mounting on the combustion chamber cup member.

The bottom surface of the combustion chamber cup member is positioned in the top surface side of the housing. The bottom surface may abut against the top surface. When using a cup-like cover member, the bottom surface of the cup-like cover member may abut or be pressed against the top surface of the housing.

When the gas generating agent in the combustion chamber (in the combustion chamber cup member) is burnt, generated combustion gas passes through the communication holes, and causes the cover member to spread open, whereby the peripheral wall surface of the cover member expands and deforms (this may include partial splitting of the cover member). Such expansion and deformation produce a gap or cleft between the cover member and the peripheral surface of the combustion chamber cup member, which have been in close contact to each other before activation. And the gap or cleft serves as a gas channel leading outside from the inside of the combustion chamber.

When gas (combustion product in the gas generator, including flames, high-temperature gas, mist-like uncombusted products and the like) passes through the gas channel, the gas comes into contact with the outer peripheral surface of the combustion chamber cup member and the inner peripheral surface of the cover member, causing heat exchange between the gas and these peripheral surfaces. As a result, the temperature of the gas drops. When the gas includes a high-temperature combustion residue (mist), the combustion residue comes into contact with these peripheral surfaces, and is adhered thereto to be captured.

The gas generator of the present invention may have two combustion chambers, one inside the combustion chamber cup member and the other outside that cup member, respectively. Alternatively, the gas generator may have a combustion chamber only inside the combustion chamber cup member.

The invention preferably provides the gas generator, wherein the cover member has a fragile portion at least at an opening peripheral edge facing the housing bottom surface.

The fragile portion is weaker than other portions, and splits preferentially upon load. The fragile portion may have a cut, or may be thinner-walled. At the time of activation, the cover member splits from the fragile portion. And a gas channel, leading to the outside from the inside of the combustion chamber, forms easily through such splitting.

The fragile portion is preferably formed to extend in the axial direction from the peripheral edge of the opening portion of the cover member, so that the fragile portion splits easily from the opening portion.

The invention preferably provides the gas generator, wherein the cover member has an enlarged-diameter portion at a peripheral edge of the opening portion facing the housing bottom surface, and has a fragile portion at least in the enlarged-diameter portion.

The enlarged-diameter portion has a larger outer diameter than that of the peripheral surface of the cover member. By forming the enlarged-diameter portion, the cover member is inserted onto the combustion chamber cup member more easily. The enlarged-diameter portion may be formed by, for example, two or more steps, or an inclined surface, or both the steps and the inclined surface. If an enlarged-diameter portion is provided, the fragile portion is provided in the enlarged-diameter portion, since the strength of the enlarged-diameter portion is higher than that of other portions.

The invention preferably provides the gas generator, wherein the combustion chamber cup member has a communication hole at a single portion in the peripheral surface thereof, and the cover member has an enlarged-diameter portion at least at a peripheral edge of the opening portion facing the housing bottom surface, and a fragile portion formed in the enlarged-diameter portion at a position opposing the communication hole in the radial direction.

The fragile portion is an essential element for forming a gas channel. However, when multiple fragile portions are formed, the contact surface area between the gas and the cover member decreases, which may deteriorate the above-described combustion residue capturing effect. With a structure in which a communication hole is provided at single portion and a fragile portion is provided in the enlarged-diameter portion at a position radially opposing the communication hole, a gas channel as well as a capturing effect of the combustion residue can be obtained.

The invention preferably provides the gas generator, wherein the combustion chamber cup member has communication holes at two portions, and the cover member has an enlarged-diameter portion at least at a peripheral edge of the opening portion facing the housing bottom surface, and fragile portions are provided in the enlarged-diameter portion at two portions, the communication holes at two portions and the fragile portions at two portions are formed equiangularly at four portions in the circumferential direction, and the communication holes at two portions are formed at opposing positions to each other in the radial direction, and the fragile portions at two portions are formed at opposing positions to each other in the radial direction.

Herein, a gas channel as well as a capturing effect of the combustion residue can be obtained, as is the case of the invention stated in the foregoing.

The invention provides the gas generator, wherein the fragile portion of the cover member is formed by a linear cut which runs through or does not run through in the thickness direction.

In order to split the fragile portion more easily at the time of activation, the fragile portion may be formed by a linear cut or a thin-wall portion. Preferably, the fragile portion is formed by a combination of a linear cut or a thin wall portion and a triangular cut formed in the peripheral edge of the opening portion or in the enlarged-diameter portion of the cover member.

The gas generator of the present invention is easy to assemble and delivers high performance in a restraint system such as an airbag device.

Embodiments of Invention

Figure 1:
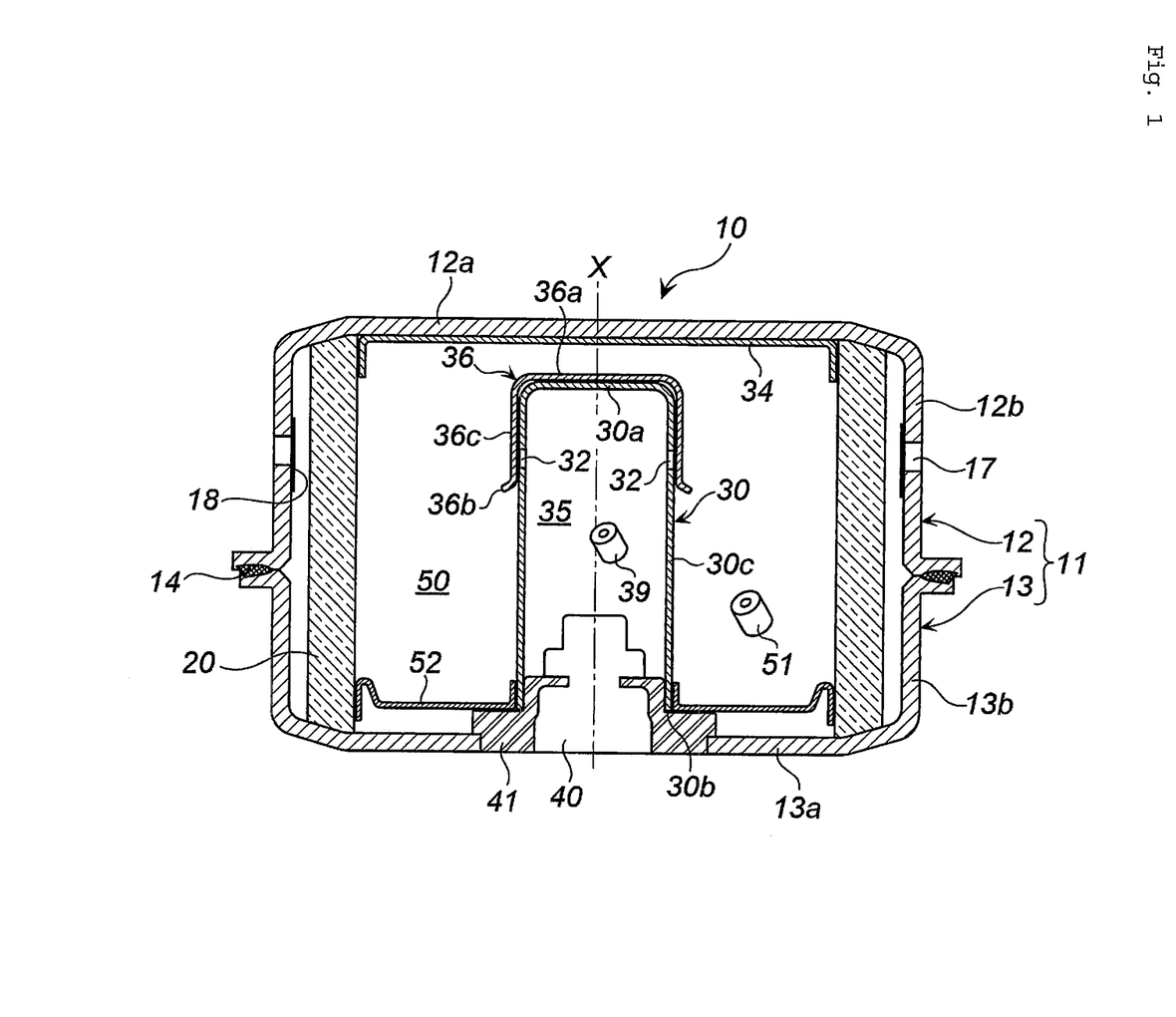
FIG. 1 shows an axial cross-sectional view of a gas generator of the present invention.

Gas Generator Shown in FIG. 1

FIG. 1 shows an axial cross-sectional view of a gas generator 10 of the present invention. The gas generator 10 has a housing 11 formed by welding a diffuser shell 12 to a closure shell 13 at welding portions 14. A known tubular filter 20 is disposed inside the housing 11. The diffuser shell 12 has a top plate 12a and a peripheral wall portion 12b, and the closure shell 13 has a bottom plate 13a and a peripheral wall portion 13b.

A predetermined number of gas discharge ports 17 are provided in the diffuser shell 12. To prevent moisture from entering, the gas discharge ports 17 are sealed from inside with an aluminum seal tape 18. A retainer 34 is fitted against the top plate 12a of the diffuser shell.

A central hole is formed in the center of the bottom plate 13a of the closure shell 13, and a collar 41 is fitted into the central hole, and is fixed thereto through welding. An igniter 40 is mounted on the collar 41. A retainer 52 is provided in the bottom plate 13a side of the closure shell.

A combustion chamber cup member 30 is disposed inside the housing 11, concentrically with the housing 11. The combustion chamber cup member 30 has a bottom surface 30a opposing the top plate 12a of the diffuser shell, and an opening portion 30b fitted onto the collar 41.

The inner space of the combustion chamber cup member 30 corresponds to a first combustion chamber 35, while the space outside thereof (space enclosed by the filter 20) constitutes a second combustion chamber 50. A predetermined amount of a first gas generating agent 39 is accommodated in the first combustion chamber 35, while a predetermined amount of a second gas generating agent 51 is accommodated in the second combustion chamber 50. Known gas generating agents (for instance, those of JP-A No. 2005-199867) may be used as the first gas generating agent 39 and the second gas generating agent 51. As the second gas generating agent 51, the agent having a lower combustion temperature than that of the first gas generating agent 39 is used.

A communication hole 32 is formed in a peripheral wall 30c of the combustion chamber cup member 30. The communication hole 32 may be formed as a single communication hole, or as a plurality thereof, so as to afford a given opening area. In FIG. 1, two communication holes 32 are formed at opposite positions in the radial direction.

A cup-like cover member 36 covers the combustion chamber cup member 30 from the bottom surface 30a side thereof. The cover member 36 is made of stainless steel and has a thickness of 0.4 mm. The cover member 36 has a bottom surface 36a, an opening portion opposing the bottom surface 36a, and a peripheral surface 36c. An enlarged-diameter portion 36b is formed at the peripheral edge of the opening portion. By providing the enlarged-diameter portion 36b, the cover member 36 can be easily fitted onto the combustion chamber cup member 30.

A gap is formed between the bottom surface 36a of the cover member 36 and the retainer 34, such that, preferably, the second gas generating agent 51 cannot get into the gap. The bottom surface 36a of the cover member 36 may be in contact with the retainer 34.

Figure 2A:
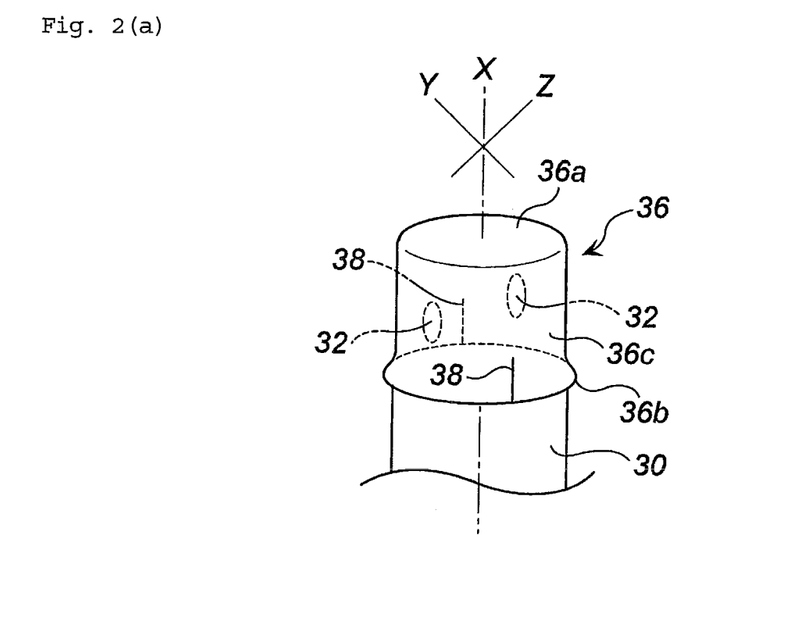
FIG. 2(a) shows a perspective view showing a combination of a combustion chamber cup member 30 and a cover member 36.
Figure 2B:
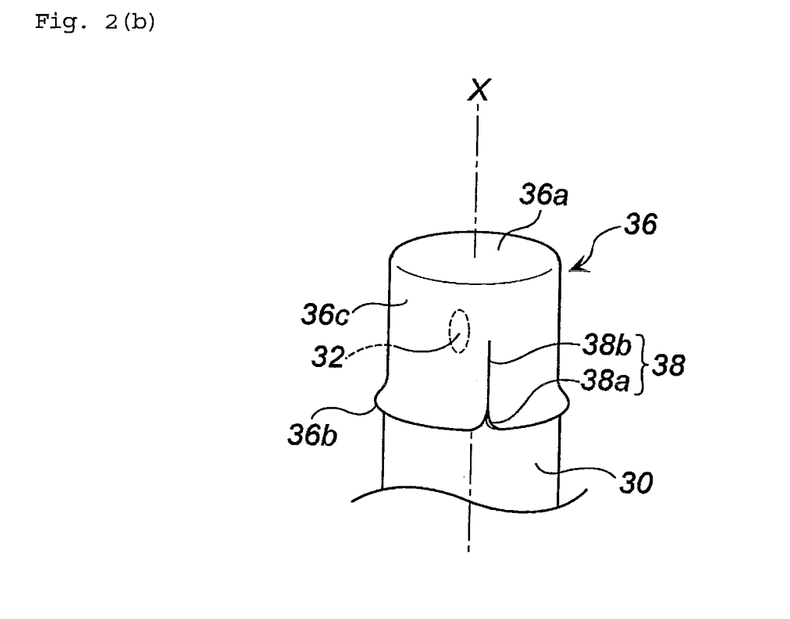
FIG. 2(b) shows a perspective view showing a combination of a combustion chamber cup member 30 and a cover member 36 of a different embodiment from FIG. 2(a)

With reference to FIG. 2(a) and FIG. 2(b), the combination of the combustion chamber cup member 30 and the cover member 36 will be described in detail. FIG. 2(a) is a perspective view of a cup-like cover member 36 covering the combustion chamber cup member 30. FIG. 2(b) is a perspective view of another embodiment.

In the combination of the combustion chamber cup member 30 and the cover member 36 shown in FIG. 2 (a), the cover member 36 covers the combustion chamber cup member 30 from the bottom surface side thereof, such that two communication holes 32 formed in the combustion chamber cup member 30 are covered by a peripheral surface 36c of the cover member. The peripheral surface 36c of the cover member and the peripheral wall 30c of the combustion chamber cup member 30 are in close contact with each other.

In the peripheral surface 36c of the cover member, there are formed two fragile portions 38, extending in the axial direction from the enlarged-diameter portion 36b, so that the fragile portions 38 split easily apart from the enlarged-diameter portion 36b at the time of activation. The fragile portions 38 are in a shape of a groove that do not run through the peripheral surface 36c of the cover member. The two communication holes 32 oppose each other (in the Z-axis direction in the drawing), and the two fragile portions 38 face also each other (in the Y-axis direction in the drawing). The two communication holes 32 and the two fragile portions 38 are formed equidistantly in the circumferential direction (the Y-axis and the Z-axis in the drawing are perpendicular to each other).

In the combination of the combustion chamber cup member 30 and the cover member 36 shown in FIG. 2(b), the cover member 36 covers the combustion chamber cup member 30 from the bottom surface side thereof, such that one communication hole 32 formed in the combustion chamber cup member 30 is covered by the peripheral surface 36c of the cover member. The peripheral surface 36c of the cover member and the peripheral wall of the combustion chamber cup member 30 are in close contact with each other.

The fragile portion 38 is provided in the peripheral surface 36c of the cover member. The fragile portion 38 includes a triangular cut 38a formed in the enlarged-diameter portion 36b, and a groove-like cut 38b, formed on a prolongation line from the vertex of the cut 38a, that does not run through the peripheral surface 36c of the cover member. The communication hole 32 and the fragile portion 38 are formed at opposing positions.

Next, the operation of the gas generator 10 shown in FIG. 1 when assembled into an airbag apparatus of an automobile will be described.

Embodiment of a combination of the combustion chamber cup member 30 and the cover member 36 shown in FIG. 2(a)

The operation will be explained with reference to FIG. 1, FIG. 2(a), FIG. 3(a) and FIG. 3(b). When the automobile collides, a command is received from an impact sensor and the igniter 40 is activated, whereupon the first gas generating agent 39 in the first combustion chamber 35 is ignited and burnt, thereby generating a combustion product. The combustion product passes through the two communication holes 32 provided in the combustion chamber cup member 30, is ejected into the second combustion chamber 50, and ignites and burns the second gas generating agent 51, and then discharged through the gas discharge ports 17 into an airbag (not shown), whereby the airbag is inflated.

Figure 3A:
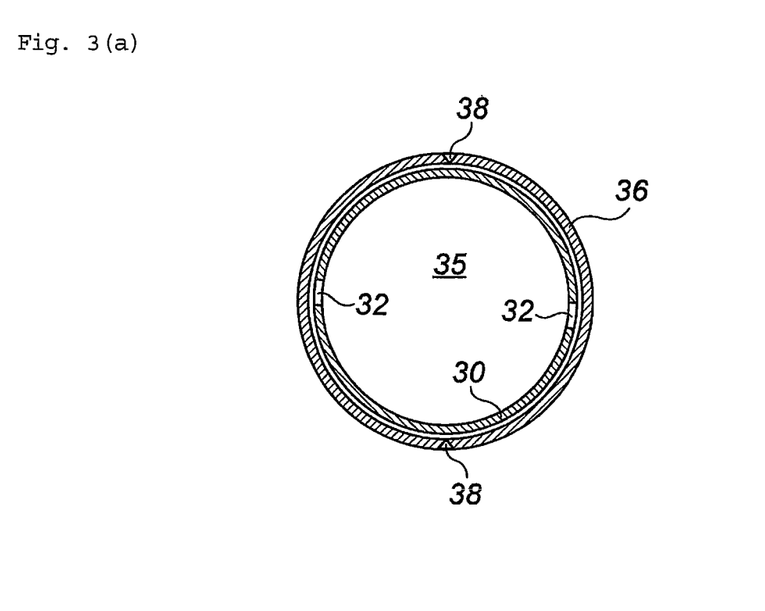
FIG. 3(a) and FIG. 3(b) are explanatory diagrams of operation when using the combination of FIG. 2(a)

In this operation process, the combustion chamber cup member 30 and the cover member 36 before the activation is in the state shown in FIG. 3(a). For easier understanding, in FIG. 3(a), a gap is provided between the combustion chamber cup member 30 and the cover member 36 but there is no gap threrebetween in practice.

Figure 3B:
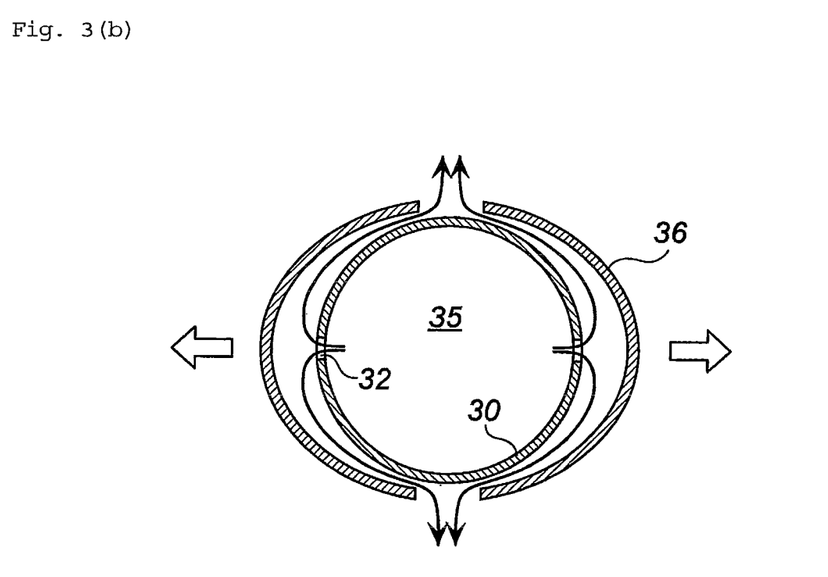

When the first gas generating agent 39 burns by activation of the igniter 40, the generated combustion product is discharged through the two communication holes 32, whereupon the cover member 36 is pushed in the Z-axis direction. Tensile stress in the Z-axis direction acts on the two fragile portions 38, and hence the fragile portions 38 split readily to be in the state shown in FIG. 3(b). As a result, a gap that forms a gas channel between the combustion chamber cup member 30 and the cover member 36 is provided. As shown in FIG. 3(b), gas flows through the gap and the split portions, and reaches the second combustion chamber 50. The combustion product flows while in contact with the combustion chamber cup member 30 and the cover member 36. As a result, the combustion product is cooled and the combustion residue contained in the combustion product is trapped, so that there decreases the amount of combustion residue reaching the filter 20.

Embodiment of a combination of the combustion chamber cup member 30 and the cover member 36 shown in FIG. 2(b)

The operation will be explained with reference to FIG. 1, FIG. 2(b), FIG. 4(a) and FIG. 4(b). When the automobile collides, a command is received from an impact sensor and the igniter 40 is activated, whereupon the first gas generating agent 39 in the first combustion chamber 35 is ignited and burnt, thereby generating a combustion product. The combustion product passes through the one communication hole 32 provided in the combustion chamber cup member 30, is ejected into the second combustion chamber 50, and ignites and burns the second gas generating agent 51, and then be discharged through the gas discharge ports 17 into an airbag (not shown), whereby the airbag is inflated.

Figure 4A:
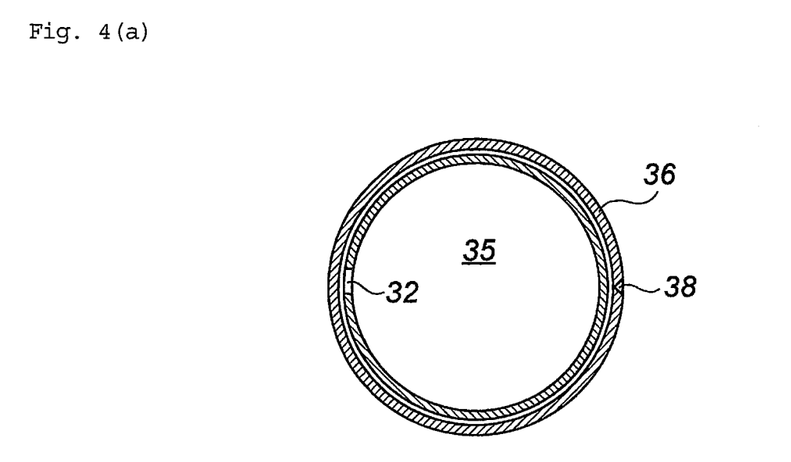
FIG. 4(a) and FIG. 4(b) are explanatory diagrams of operation when using the combination of FIG. 2(b)

In this operation process, the cover member 36 and the combustion chamber cup member 30 before the activation is in the state shown in FIG. 4(a). For easier understanding, in FIG. 4(a), a gap is provided between the combustion chamber cup member 30 and the cover member 36 but there is no gap threrebetween in practice.

Figure 4B:
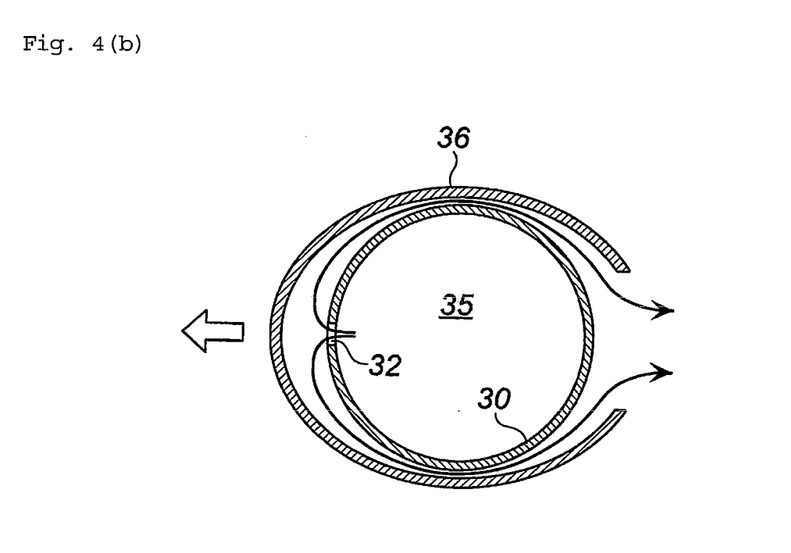

When the first gas generating agent 39 burns by activation of the igniter 40, the generated combustion product is discharged through the one communication hole 32, whereupon the cover member 36 is pushed in one direction. Tensile stress acts on the fragile portion 38, and hence the fragile portion 38 splits readily to be in the state shown in FIG. 4(b). As a result, a gap that forms a gas channel between the combustion chamber cup member 30 and the cover member 36 is provided. As shown in FIG. 4(b), gas flows through the gap and the split portions, and reaches the second combustion chamber 50. The combustion product flows while in contact with the combustion chamber cup member 30 and the cover member 36. As a result, the combustion product is cooled and the combustion residue contained in the combustion product is trapped, so that there decreases the amount of combustion residue reaching the filter 20.

Figure 5:
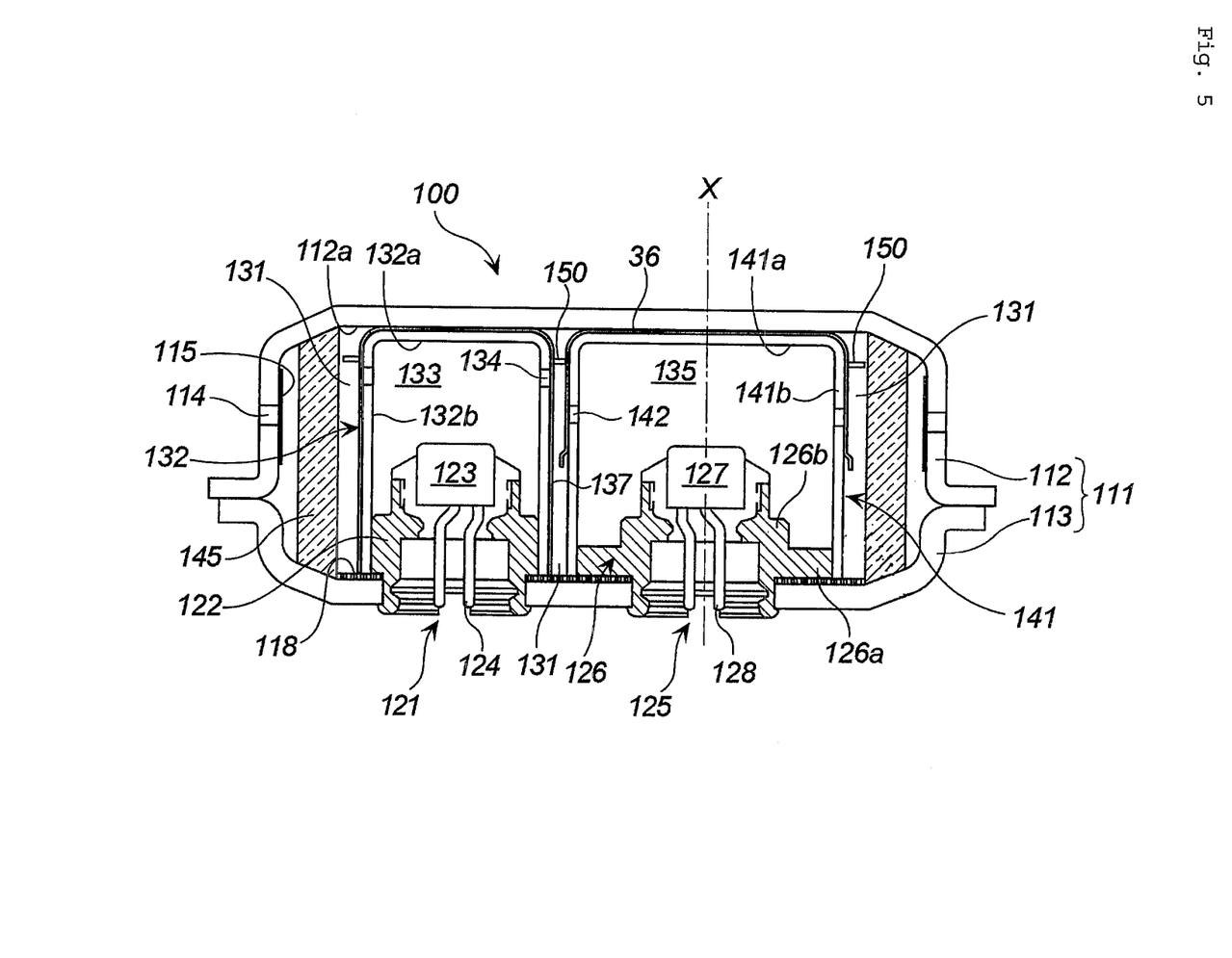
FIG. 5 is an axial cross-sectional view of another embodiment of the gas generator of the present invention.

Gas Generator Shown in FIG. 5

The present invention can also be used in known gas generators. An example thereof is shown in FIG. 5. FIG. 5 shows an example where the cover member 36 shown in FIG. 2(a) and FIG. 2(b) covers a combustion chamber cup member 141, covered from the bottom 141a side thereof, instead of a cup-like thin film member 147 of the gas generator 100 shown in FIG. 3 of JP-A No. 2007-118788.

Except for using the cover member 36, but no cup-like thin film member 147, the gas generator 100 shown in FIG. 5 is identical to the one shown in FIG. 3 of the above publication.

When using the cover member 36 of FIG. 2(b), the communication hole 142 of the combustion chamber cup member 141 may be arranged to face a filter 145. The combustion chamber cup member 141 and the cover member 36 may replace the combination of the combustion chamber cup member 30 and the cover member 36 shown in FIG. 2(a) and FIG. 2(b).

When the gas generating agent in the second combustion chamber 135 is first burnt in the gas generator shown in FIG. 5, the cover member 36 deforms as illustrated in FIG. 3(b) and FIG. 4(b), causing the second combustion chamber 135 and a first combustion chamber 131 to communicate with each other. The cover member 36, however, does not deform when the gas generating agent in the first combustion chamber 131 burns first.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a housing having a gas discharge port,
a combustion chamber cup member disposed, in the housing, such that an opening portion thereof covers a bottom surface of the housing, the combustion chamber cup member having a communication hole at least at a single portion in its peripheral wall surface thereof,
a cover member covering an outer peripheral wall surface of the combustion chamber cup member including the communication hole, and including an enlarged-diameter portion at least at a peripheral edge of the opening portion facing a housing bottom surface, and a fragile portion formed in the enlarged diameter portion at a position opposing the communication hole in the radial direction, and
a first combustion chamber formed inside the combustion chamber cup member and accommodating a first gas generating agent and a first igniter therein,
at the time of activation, the cover member expanding and deforming mainly in the radial direction to form a gap between the peripheral wall surface of the combustion cup member and the cover member, which serves as a gas channel communicating the first combustion chamber and the outside of the first combustion chamber.

2. The gas generator according to claim 1, wherein the fragile portion of the cover member is formed by a linear cut which runs through or does not run through in the thickness direction.

3. The gas generator according to claim 1, wherein the cover member is a metallic cover member.

4. The gas generator according to claim 1, further comprising:
a second combustion chamber including a second gas generating material, and provided within the housing and outside of the combustion chamber cup member; and
a second igniter provided in the second chamber,
wherein when the first gas generating agent is first burnt, the cover member expands and deforms causing the first combustion chamber and the second combustion chamber to communicate with each other, but when the second gas generating agent burns first, the cover member does not deform.

5. A gas generator, comprising:
a housing having a gas discharge port;
a combustion chamber cup member disposed, in the housing, such that an opening portion thereof covers a bottom surface of the housing, the combustion chamber cup having a communication hole at least at a portion of its peripheral wall surface thereof;
a cover member covering an outer peripheral wall surface of the combustion chamber cup member including the communication hole; and
a first combustion chamber formed inside the combustion chamber cup member and accommodating a first gas generating agent and a first igniter therein,
at the time of activation, the cover member expanding and deforming mainly in the radial direction to form a gap between the peripheral wall surface of the combustion cup member and the cover member, which serves as a gas channel communicating the first combustion chamber and the outside of the first combustion chamber,
wherein the combustion chamber cup member has two communication holes,
and the cover member has an enlarged-diameter portion at least at a peripheral edge of the opening portion facing the housing bottom surface, and two fragile portions are provided in the enlarged-diameter portion,
the communication holes and the fragile portions are formed equiangularly at four portions in the circumferential direction, and
the communication holes are formed at opposing positions to each other in the radial direction, and the fragile portions are formed at opposing positions to each other in the radial direction, such that the communication holes and the fragile portions do not overlap.

6. The gas generator according to claim 5, wherein the fragile portion of the cover member is formed by a linear cut which runs through or does not run through in the thickness direction.

7. The gas generator according to claim 5, further comprising:
a second combustion chamber including a second gas generating material, and provided within the housing and outside of the combustion chamber cup member; and
a second igniter provided in the second chamber,
wherein when the first gas generating agent is first burnt, the cover member expands and deforms causing the first combustion chamber and the second combustion chamber to communicate with each other, but when the second gas generating agent burns first, the cover member does not deform.

8. A gas generator, comprising:
a housing having a gas discharge port,
a combustion chamber cup member disposed, in the housing, such that an opening portion thereof covers a bottom end surface of the housing,
the combustion chamber cup member having a communication hole at least at a portion of its peripheral wall surface thereof,
a cover member including a bottom surface, an opening portion opposing the bottom surface, and a peripheral surface and covering the peripheral wall surface including the communication hole, and the cover member having a fragile portion at least at a peripheral edge of the opening portion facing the bottom end surface of the housing and the fragile portion extending from the peripheral edge only in an axial direction of the housing so as not to reach the bottom surface, the fragile portion being provided at a position that does not overlap the communication hole, and
a first combustion chamber formed inside the combustion chamber cup member and accommodating a first gas generating agent and a first igniter therein,
at the time of activation, the cover member expanding and deforming mainly in the radial direction such that the peripheral surface of the cover member, separated along the fragile portion including the peripheral edge, forms a gap between the peripheral wall surface of the combustion cup member and the cover member, which serves as a gas channel communicating the first combustion chamber and the outside of the first combustion chamber.

9. The gas generator according to claim 8, wherein the cover member is a metallic cover member.

10. The gas generator according to claim 8, further comprising:
a second combustion chamber including a second gas generating material, and provided within the housing and outside of the combustion chamber cup member; and
a second igniter provided in the second chamber,
wherein when the first gas generating agent is first burnt, the cover member expands and deforms causing the first combustion chamber and the second combustion chamber to communicate with each other, but when the second gas generating agent burns first, the cover member does not deform.

11. The gas generator according to claim 8, wherein the cover member has an enlarged-diameter portion at a peripheral edge of the opening portion, and has the fragile portion at least in the enlarged-diameter portion.

12. The gas generator according to claim 8, wherein the fragile portion is formed by a linear cut which runs through or does not run through the thickness direction.

\* \* \* \* \*